Dec. 23, 1952      D. H. ANNIN      2,622,620
FLUID PRESSURE CONTROLLED FLEXIBLE TUBE VALVE
Filed June 21, 1946      2 SHEETS—SHEET 2
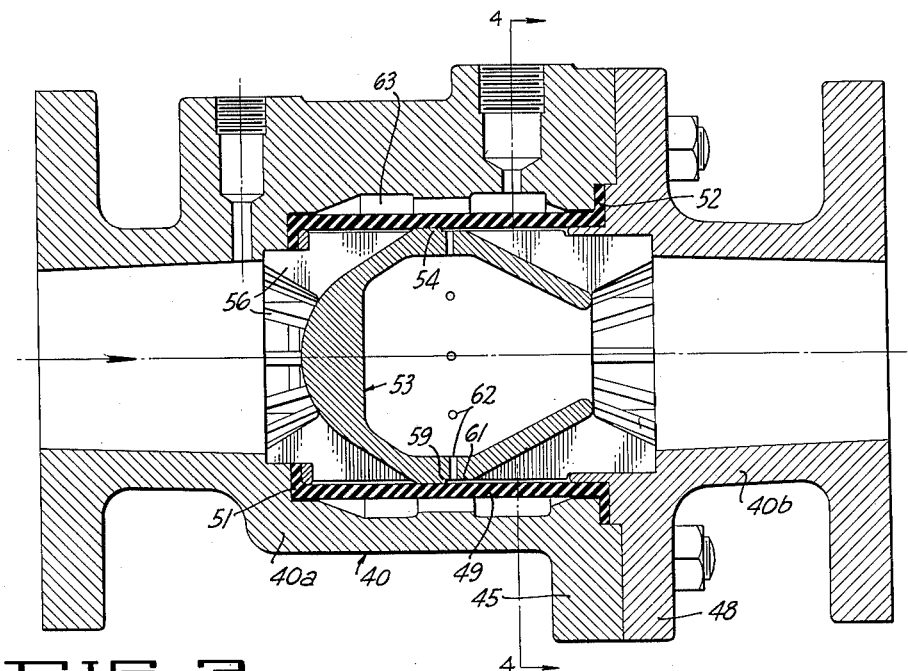
FIG_3_
FIG_4_
FIG_5_
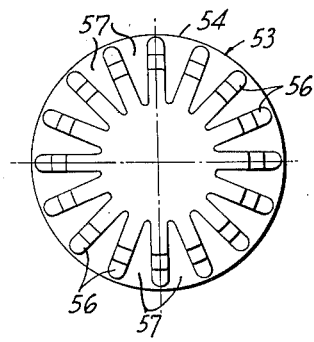
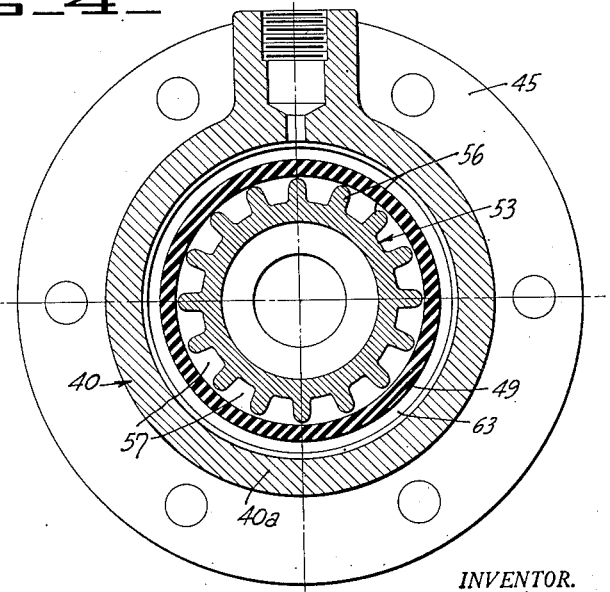
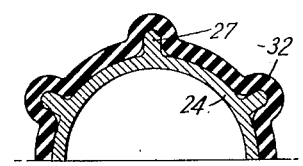
FIG_2A_
INVENTOR.
Douglas H. Annin
BY
ATTORNEYS Patented Dec. 23, 1952

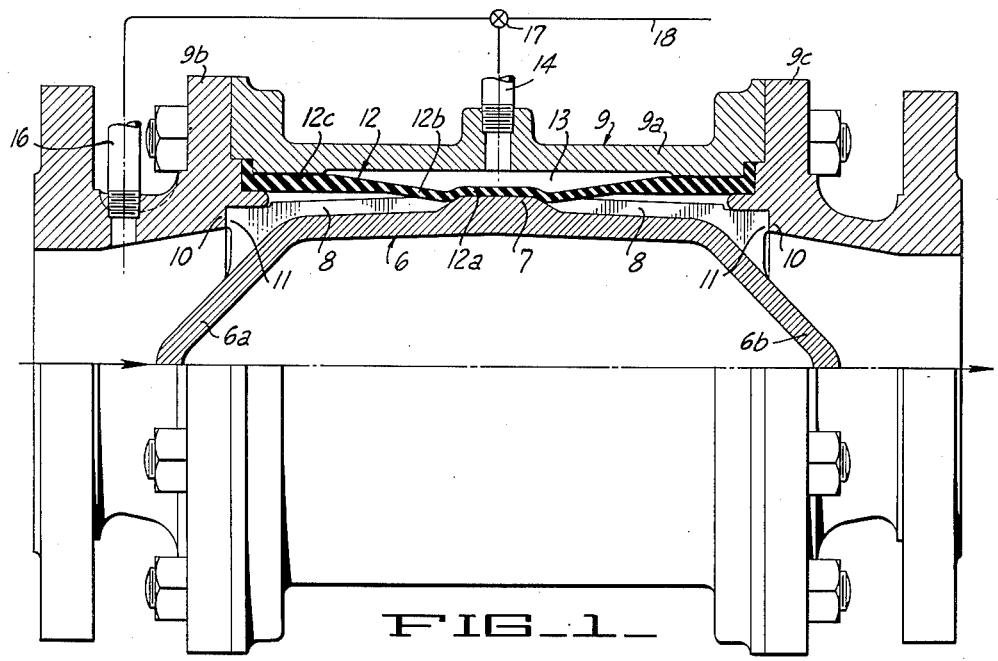
FIG_1_
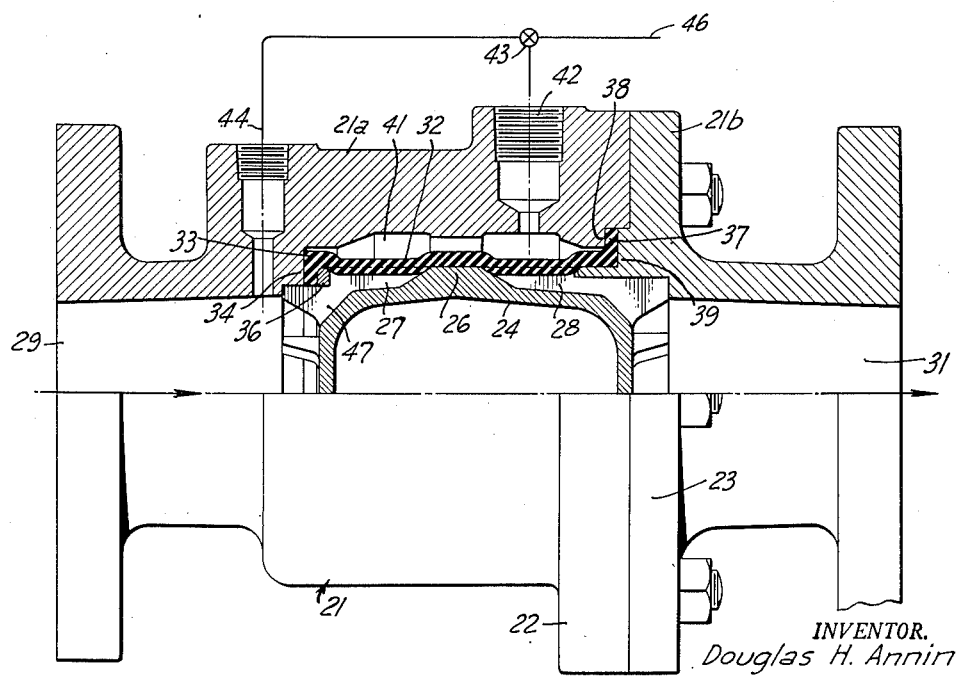
FIG_2_
INVENTOR.
Douglas H. Annin
BY
ATTORNEYS

2,622,620

UNITED STATES PATENT OFFICE 2,622,620

FLUID PRESSURE CONTROLLED FLEXIBLE TUBE VALVE

Douglas H. Annin, Oakland, Calif., assignor, by mesne assignments, to Grove Regulator Company, a corporation of California Application June 21, 1946, Serial No. 678,467

3 Claims. (Cl. 137—688)

This invention relates generally to the construction of fluid flow control valves.

In the past valves have been used which employ an expansible rubber sleeve or tube adapted to seal upon a rigid inner barrier. Such valves are for example shown in Patents 2,331,291, 2,353,143, and 2,360,873. As manufactured in the past the inner core construction employed in such valves includes a rigid barrier together with circumferentially spaced bars extending on opposite sides of the barrier, the bars forming circumferentially spaced slots for flow of fluid. A core of this type is relatively difficult to manufacture and requires advanced molding and casting techniques.

Referring to the drawing:

Figure 1 is a side elevational view in half section illustrating a valve incorporating the present invention.

Figure 2 is a view similar to Figure 1 but showing another embodiment of the invention.

Figure 2A is a cross-sectional detail showing how the tube collapses upon the core.

Figure 3 is a side elevational view in section showing another embodiment of the invention.

Figure 4 is a sectional view taken along the line 4—4 of Figure 3.

Figure 5 is an end view of the core construction embodied in Figures 3 and 4.

The valve illustrated in Figure 1 consists of a core 6 which is formed of suitable rigid material, and which is provided with an annular sealing area 7. It is also provided with the annular end core portions 6a and 6b, each of which is provided with the circumferentially spaced ribs 8. The body 9 is annular in transverse cross section, and can be formed in three parts 9a, 9b, and 9c, suitably clamped together as by coupling flanges. The body parts 9b and 9c have annular shoulders 10 engaging the ends 11 of the ribs.

The resilient rubber tube 12 has a relatively thin wall portion 12a which seals upon the annular area 7, tapered wall portions 12b, and relatively thick wall portions 12c. A closed fluid chamber 13 is formed within the body and about the resilient tube. This chamber can be connected to an external pipe 14 whereby fluid under pressure can be applied, such as the upstream line pressure. A small control pipe 16 is shown connected to the inflow passage of the valve and connects with pipe 14 through the small pilot or control valve 17. When valve 17 is turned to apply the upstream pressure to the chamber 13, inflow pressure is consequently applied about the resilient tube to retain the same closed and sealed upon the annular area 7. However when pilot valve 17 is turned to interrupt communication with the inflow side of the valve and to vent pipe 14 to the atmosphere or to the downstream side as indicated by pipe 18, the tube expands to permit flow about the core and the annular area 7.

The valve described above operates as follows: Assuming that line pressure is applied to the inflow passage, the valve remains closed while such pressure is applied to the chamber 13. In other words the pressure in chamber 13 maintains the tube collapsed upon the rigid core, thus causing the thin wall portion 12a to maintain tight sealing engagement with the annular sealing area 7. When the pilot valve 17 is turned to vent chamber 13 to the atmosphere or to the downstream side, the resilient tube is expanded whereby an annular flow orifice is formed between the thin wall portion 12a of the tube and the annular sealing area 7.

The relatively thin wall portion 12a of the resilient tube can be readily expanded from the annular sealing area 7, thus making it possible to open the valve by application of a relatively low differential pressure. In addition the pressure drop for flow of fluid through the valve is relatively low. These advantages are gained without any sacrifice in the ability of the valve to operate on relatively high pressures. When the valve is closed and a relatively high pressure applied to the inflow side, the outflow end portion of the tube beyond the sealing area 7 is collapsed upon the core and upon the ribs 8, and the thick wall portion 12c bridges across the flow area between the body and the corresponding end portion of the core. It will be evident that this thick portion of the resilient tube is capable of withstanding relatively high fluid pressures.

The core incorporated in Figure 1 is relatively simple in construction, and can be readily manufactured by the use of standard molding techniques. The ribs do not require close circumferential spacing, and the ability of the valve to withstand high pressures is determined by the bridging strength of the thickened wall portions 12c, rather than by the width of the circumferentially spaced slots, as with the cores disclosed in the aforementioned patents. Also the spacing of the ribs is such that they can be readily cast integral with the remaining body of the core, in a single casting operation, and by the use of relatively simple patterns.

As described above, the valve is used with a manually operated pilot valve 17. It should be understood that a valve of this character can be used with a suitable fluid operated pilot to operate as a pressure relief valve, a pressure reducing regulator, or a back pressure regulator.

The embodiment of Figure 2 is somewhat similar to Figure 1. The body 21 in this instance is formed in two parts 21a and 21b which are coupled together by bolts passing through the coupling flanges 22, 23. Core 24 is provided with an inturned peripheral sealing area 26 and ribs 27 and 28 extend from the intermediate portion of the core towards the inlet and outlet passages 29 and 31. The expansible tube 32 is formed with the same wall thickness for its entire length. One end of this tube has an inturned flange 33 which is clamped between an annular shoulder 34 formed on body part 21a and the annular clamping ring 36 positioned on the core. The other end of the expansible tube is provided with an outturned flange 37 which is clamped between the annular shoulder 38 upon the body part 21a and the shoulder 39 formed on body part 21b.

The closed chamber 41 formed about the expansible tube is in communication with the port 42 and can be connected to a pilot valve 43 corresponding to the valve 17 of Figure 1. This valve is also shown connected to line 44 leading to the inlet passage 29 and to the vent line 46.

Operation of the embodiment shown in Figure 2 is similar to that of Figure 1 although it will be evident that for a given wall thickness of the expansible tube the range of permissible pressures is not as great as for the embodiment of Figure 1. Thus assuming that the intermediate part of tube 32 is thicker than the intermediate portion 12a of tube 12 in Figure 1, then a greater pressure differential must be applied between the inflow and outflow passages 29, 31 to initially expand and permit flow about the core. Likewise assuming that the end portions of tube 32 are not as thick as the end portions 12c of tube 12 but that the annular orifice area 47 is dimensioned similar to Figure 1, then the permissible maximum pressure short of causing failure of the expansible tube will not be as great. It will be apparent however that the arrangement of Figure 2 possesses certain advantages over the expansible tube valve shown in the aforementioned Patents 2,331,291, 2,353,143 and 2,360,873 in that the core construction is greatly simplified and the use of narrow slots is obviated.

As shown in Figure 2A, the ribs 27 are spaced whereby when the tube is collapsed it presses on the portions of the core between the ribs.

Figures 3 to 5 inclusive illustrate another embodiment of the invention in which a fluid space is provided about the resilient tube for receiving controlling fluid under pressure. In this instance however the inner core differs from the cores of Figures 1 and 2 particularly in that it provides a sufficient number of ribs to support the resilient tube against differential pressure. The body 40 in this instance is similar to the body 21 in Figure 2 and consists of the body parts 40a and 40b which are retained together by bolts passing through the flanges 45 and 48. The resilient tube 49 is similar to the tube 32 of Figure 2 and has its end flanges 51 and 52 similarly clamped and sealed with respect to the body. The inner core construction 53 is provided with a peripheral sealing area 54 and with portions on both sides of this area which are tapered in the manner illustrated. In place of a relatively few ribs 27 as in Figure 2 a considerable number of ribs 56 are provided whereby the tube 49 is supported upon the outer edges of these ribs. Fluid flow occurs through the spaces 57 between the ribs (Fig. 5). The annular orifice area corresponding to the orifice area 47 in Figure 2 is increased in width in Figures 3 to 5 inclusive to compensate for the area occupied by the greater number of ribs 56.

In order to minimize chattering during closing operations the sealing area 54 is shown provided with an annular shoulder 59 adjacent which is an area 61 of reduced diameter. A plurality of restricted openings 62 connect the space adjacent the shoulder 59 with the outflow side of the valve. Such an arrangement makes possible smoother closing action responsive to application of fluid pressure to the chamber 63 surrounding the flexible tube 49.

In operating the valve in Figures 3 to 5 inclusive, pressure is applied to or vented from the space 63 about the flexible tube 49 to cause the tube to either contract and seal upon the area 54 or to expand under inflow of pressure to thereby permit flow of fluid through the valve body. However when pressure is applied to chamber 63 to retain the flexible tube sealed upon area 54 the tube 49 is supported by the ribs and therefore does not bridge the annular orifice area corresponding to the orifice area 47 of Figure 2.

I claim:

1. In a valve, a body having inflow and outflow passages, a core mounted within the body and interposed between the passages, the core intermediate its ends forming a barrier about which flow must occur and having an annular sealing area upon the periphery of the barrier, an annular orifice area between each end portion of the core and the body, said orifice areas serving to connect the inflow and outflow passages with the space about the core and being spaced longitudinally from the sealing area, a resilient tube disposed within the body and about the core, said tube having one annular portion of the same intermediate its ends of relatively thin wall thickness and adapted to normally contact and seal upon said annular area, said tube having end portions of the same adjacent said annular orifice areas, each of said end portions having a wall thickness relatively great compared to the wall thickness of said intermediate portion, said end tube portions being adapted to span said orifice areas when external pressure is applied about the tube to collapse the same upon the core, the ends of the tube being sealed with respect to the housing about the inflow and outflow passages, annular portions of said tube which join the thin wall portion to the thick wall portions being of tapered wall thickness, said body forming a closed chamber about the tube for receiving fluid under pressure.

2. In a valve, a body having inflow and outflow passages, a core mounted within the body and interposed between the passages, said core intermediate its ends forming an annular barrier about which flow must occur and having an annular sealing area on its periphery, an annular orifice area between each end portion of the core and the body, said orifice areas serving to connect the inflow and outflow passages with the space about the core and being spaced longitudinally from the sealing area, circumferentially spaced ribs on the periphery of the core and extending from the barrier toward both ends of the core, a resilient tube disposed within the body and about the core, said tube having one annular portion of the same of relatively thin wall thickness adapted to normally contact and seal upon said annular area, said tube having end portions of the same adjacent said annular orifices and of a wall thickness relatively great compared to the wall thickness of said first named portion, said end portions of the tube being adapted to span said orifice areas when external pressure is applied about the tube to collapse the same upon the core, said last named portions of the tube being sealed to the housing about the inflow and outflow passages, portions of the tube intermediate the thin wall portion and the thick wall portions being of tapered wall thickness, said body being formed to provide a closed chamber about the tube adapted to receive fluid under pressure.

3. In a valve, a body having inflow and outflow passages, a core mounted within the body and interposed between the passages, said core forming a barrier about which flow must occur and having an annular sealing area intermediate the ends of the core and on the periphery of the same, a resilient tube disposed within the body and about the core, the end portions of the core being formed for flow of fluid between the inflow and outflow passages and about said sealing area when the tube is expanded, one end portion of the core forming an annularly contoured extension dimensioned to provide a substantially annular orifice area between the core and the corresponding end of the tube, circumferentially spaced and longitudinally extending ribs on the periphery of said one end of the core and extending from the sealing area to said orifice area, said tube having an annular portion of the same intermediate its ends adapted to normally contact and seal upon said annular area, the ends of said tube being sealed with respect to the body, portions of said tube being adapted to press against said ribs and against the peripheral portions of the core between the ribs and to span said orifice area when external pressure is applied about the tube to collapse the same upon the core, said body forming a closed chamber about the tube to receive fluid under pressure.

DOUGLAS H. ANNIN.

REFERENCES CITED

The following references are of record in the file of this patent:

UNITED STATES PATENTS

| Number | Name | Date |
| --- | --- | --- |
| 1,800,066 | Glass | Apr. 7, 1931 |
| 2,247,363 | Dunn | July 1, 1941 |
| 2,331,291 | Annin | Oct. 12, 1943 |
| 2,470,744 | Korn | May 17, 1949 |
| 2,487,226 | Eastman | Nov. 8, 1949 |